(12) United States Patent
Wojciechowski

(10) Patent No.: US 7,711,888 B2
(45) Date of Patent: May 4, 2010

(54) SYSTEMS AND METHODS FOR IMPROVING DATA TRANSFER BETWEEN DEVICES

(75) Inventor: Roy D. Wojciechowski, Round Rock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 101 days.

(21) Appl. No.: 11/967,086

(22) Filed: Dec. 29, 2007

(65) Prior Publication Data

US 2008/0162769 A1 Jul. 3, 2008

Related U.S. Application Data

(60) Provisional application No. 60/883,020, filed on Dec. 31, 2006.

(51) Int. Cl.
*G06F 13/00* (2006.01)
(52) U.S. Cl. .................. 710/315; 710/29; 710/33; 710/35; 710/71
(58) Field of Classification Search .............. 710/29, 710/33, 35, 52, 71, 310, 311, 315
See application file for complete search history.

(56) References Cited

U.S. PATENT DOCUMENTS

| | | | | |
|---|---|---|---|---|
| 5,533,204 A * | 7/1996 | Tipley | ....................... | 710/108 |
| 5,694,556 A * | 12/1997 | Neal et al. | .................. | 710/310 |
| 6,175,888 B1 * | 1/2001 | Guthrie et al. | .............. | 710/310 |
| 6,581,129 B1 * | 6/2003 | Buckland et al. | ............ | 710/306 |
| 7,039,747 B1 * | 5/2006 | Mattur et al. | ................ | 710/310 |
| 7,054,987 B1 * | 5/2006 | Reed et al. | .................. | 710/310 |
| 2004/0022094 A1 * | 2/2004 | Radhakrishnan et al. | .... | 365/200 |
| 2004/0225822 A1 * | 11/2004 | Takeda et al. | ............... | 710/310 |
| 2005/0182886 A1 * | 8/2005 | Edirisooriya et al. | ........ | 710/310 |
| 2006/0041706 A1 * | 2/2006 | Su et al. | ..................... | 710/310 |
| 2008/0168259 A1 * | 7/2008 | Biran et al. | ................. | 712/207 |
| 2008/0256284 A1 * | 10/2008 | Evoy et al. | .................. | 710/316 |

* cited by examiner

*Primary Examiner*—Glenn A Auve
(74) *Attorney, Agent, or Firm*—William B. Kempler; Wade J. Brady, III; Frederick J. Telecky, Jr.

(57) ABSTRACT

Systems and methods are disclosed for detecting a first device on a first bus issuing a read request for an amount of data to a second device on a second bus. The systems and methods further include detecting a bridge requesting a first portion of the data from the second device on behalf of the first device in response to the bridge receiving the read request, where the bridge couples the first bus to the second bus. In addition, the systems and methods include triggering the bridge to request an additional portion of the data on behalf of the first device.

13 Claims, 2 Drawing Sheets

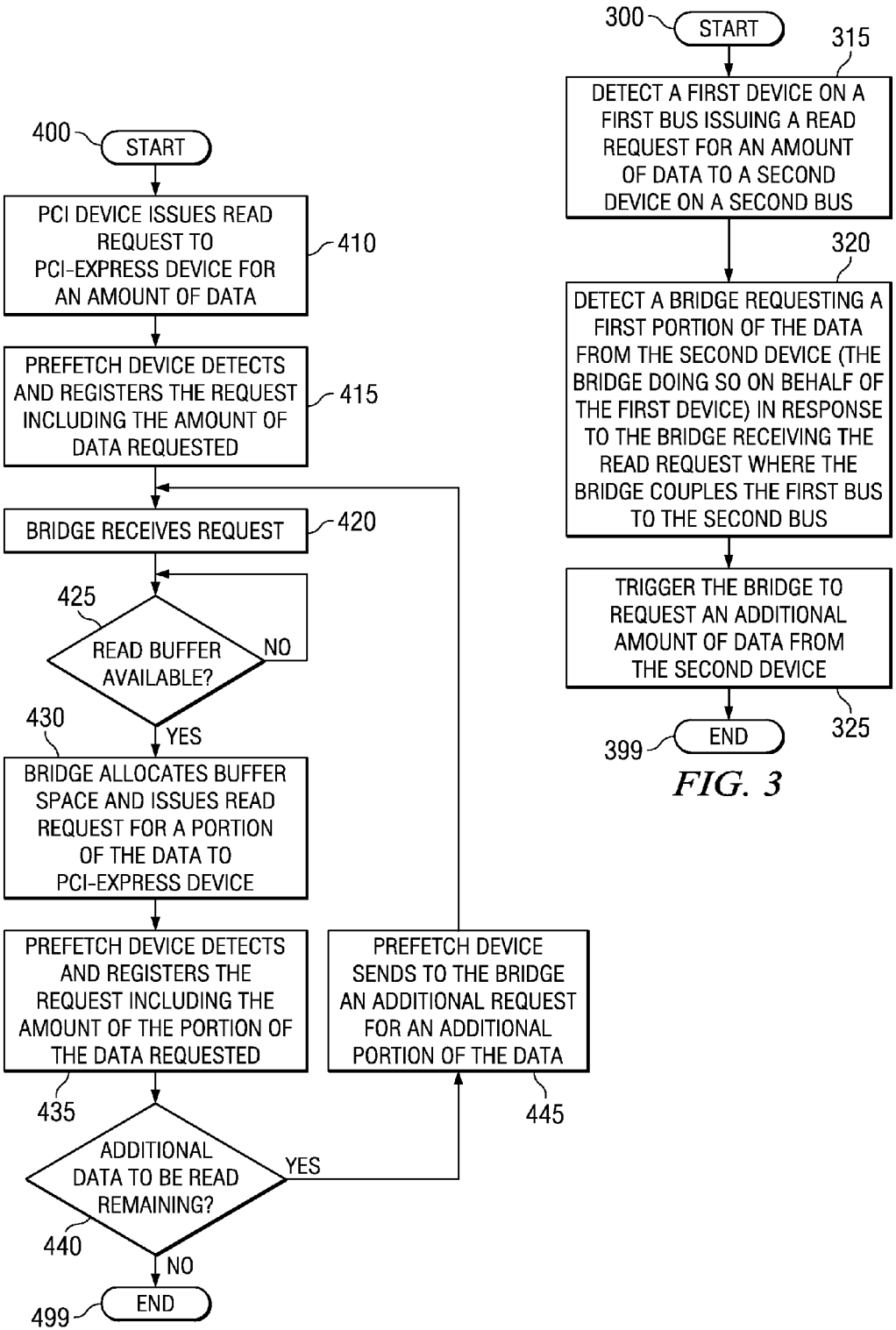

SYSTEMS AND METHODS FOR IMPROVING DATA TRANSFER BETWEEN DEVICES

I. CROSS REFERENCE TO RELATED APPLICATIONS

This application claims priority to U.S. provisional application Ser. No. 60/883,020, filed on Dec. 31, 2006, the entire contents of which are incorporated by reference herein.

II. BACKGROUND

The invention relates generally to improving data transfers between two devices, each on a different bus, the busses coupled with a bridge.

Often devices serviced by different busses need to communicate with each other in order to exchange data. Typically busses of different types may be coupled together using a bridge. In order to exchange data, devices from one typically send read and write requests to the devices on the other bus through the bridge.

In some instances, however, bridges may not have the capability to communicate across the bridge the amount of data that is being requested from one device to another, thereby leading to inefficient data transfers between devices located on different busses.

Systems and methods are therefore needed that overcome the inefficiencies in data transfers between devices located on different busses.

III. SUMMARY

In one respect, disclosed is a method for detecting a first device on a first bus issuing a read request for an amount of data to a second device on a second bus; detecting a bridge requesting a first portion of the data from the second device on behalf of the first device in response to the bridge receiving the read request, the bridge coupling the first bus to the second bus; and triggering the bridge to request an additional portion of the data on behalf of the first device.

In another respect, disclosed is a prefetch device, where the prefetch device is configured to couple to a first device on a first bus and where the prefetch device is configured to couple to a bridge coupling the first bus to a second bus, the second bus being coupled to a second device, the prefetch device being further configured to: detect the first device on the first bus issuing a read request for an amount of data to the second device on the second bus; detect the bridge requesting a first portion of the data from the second device on behalf of the first device in response to the bridge receiving the read request; and trigger the bridge to request an additional portion of the data on behalf of the first device.

In yet another respect, disclosed is a computer program product stored on a computer operable medium, the computer program product comprising software code effective to: detect a first device on a first bus issuing a read request for an amount of data to a second device on a second bus; detect a bridge requesting a first portion of the data from the second device on behalf of the first device in response to the bridge receiving the read request, the bridge coupling the first bus to the second bus; and trigger the bridge to request an additional portion of the data on behalf of the first device.

In yet another respect, disclosed is an information handling system comprising: one or more processors; one or more memory units coupled to the processor; one or more communications devices coupled to the processor; and a prefetch device, where the prefetch device is configured to couple to a first device on a first bus and where the prefetch device is configured to couple to a bridge coupling the first bus to a second bus, the second bus being coupled to a second device, the prefetch device being configured to: detect the first device on the first bus issuing a read request for an amount of data to the second device on the second bus; detect the bridge requesting a first portion of the data from the second device on behalf of the first device in response to the bridge receiving the read request; and trigger the bridge to request an additional portion of the data on behalf of the first device.

Numerous additional embodiments are also possible.

IV. BRIEF DESCRIPTION OF THE DRAWINGS

Other objects and advantages of the invention may become apparent upon reading the detailed description and upon reference to the accompanying drawings.

FIG. 3 is a flow diagram illustrating a method for efficiently handling data read requests from a first device on a first bus to a second device on a second bus, in accordance with some embodiments.

FIG. 4 is a flow diagram illustrating a method for efficiently handling read data requests from a device on a Peripheral Component Interconnect (PCI) bus to a device on a PCI-Express bus, in accordance with some embodiments.

Figure 1:
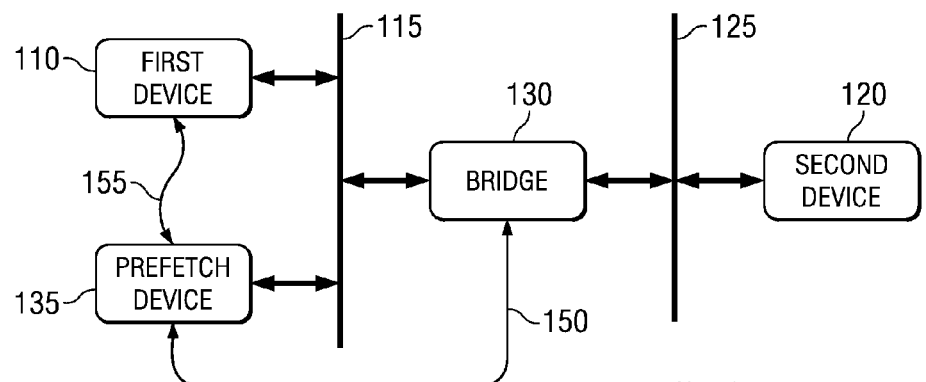
FIG. 1 is a block diagram illustrating a system for efficiently handling data read requests from a first device on a first bus to a second device on a second bus, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

FIG. 1 is a block diagram illustrating a system for efficiently handling data read requests from a first device on a first bus to a second device on a second bus, in accordance with some embodiments. In some embodiments, first device 110 is coupled to first bus 115 and second device 120 is coupled to second bus 125. Bridge 130 is configured to facilitate communications between devices on first bus 115 and second bus 125, such as first device 110 and second device 120.

Prefetch device 135 is configured to increase the efficiency of data transfers between first device 110 and second device 120. For example, prefetch device 135 is configured to increase the efficiency of read requests for data being transferred to first device 110 from second device 120. In some embodiments, prefetch device 135 monitors the communications between first device 110 and bridge 130 using data hooks 150 and data hooks 155. Additional information on the functionality of prefetch device 135 and the other devices is provided in the flow diagram of FIG. 3 and corresponding description. In some embodiments, first device 110 and second device 120 may include graphics devices, sound devices, network devices, and so on. In some embodiments, prefetch device 135 may be implemented in hardware or software or a combination of the two. Prefetch device 135 may include one or more processors/controllers, one or more memory units, and one or more communications devices for interfacing with other devices. Prefetch device 135 may also include one or more Field Programmable Gate Array (FPGA) devices, for example.

Figure 2:
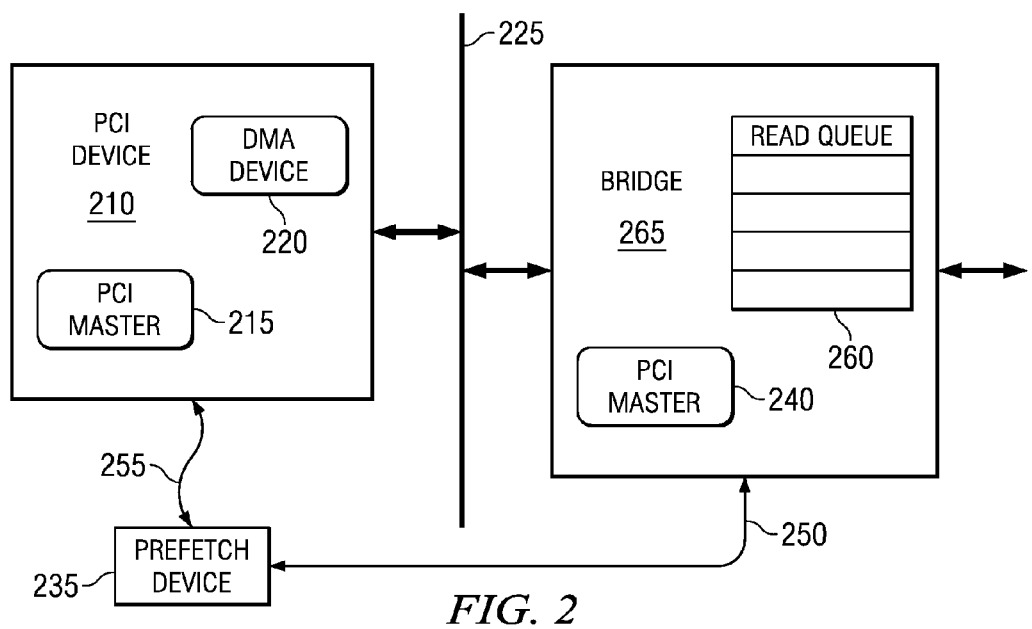
FIG. 2 is a block diagram illustrating a system for efficiently handling read data requests from a device on a Peripheral Component Interconnect (PCI) bus to a device on a PCI-Express bus, in accordance with some embodiments.

FIG. 2 is a block diagram illustrating a system for efficiently handling read data requests from a device on a Peripheral Component Interconnect (PCI) bus to a device on a PCI-Express bus, in accordance with some embodiments. Prefetch device 235 is configured to optimize data transfers between Peripheral Component Interconnect (PCI) device 210 on bus 225 and PCI-Express devices on a PCI-Express bus (not shown in FIG. 2) through bridge 265. In some embodiments, in response to Direct Memory Access (DMA) device 220 in PCI-device 210 requesting an amount of data from a PCI-Express device (not shown in FIG. 2), PCI master 215 initiates the transfer by communicating with PCI master 240 of bridge 265 as is shown in FIG. 2. In some embodiments, bridge 265 issues a request for a portion of the amount of the data to the appropriate PCI-Express device depending on available space in read queue 260. In some embodiments, prefetch device 235 may have similar functionality to prefetch device 135.

To facilitate a more efficient transfer of data, prefetch device 235 uses data hooks 255 and data hooks 250 to monitor activity in PCI device 210 and bridge 265, respectively. Read queue 260 is used by bridge 265 to buffer read requests from the PCI devices.

Additional information on the functionality of prefetch device 235 and on the other devices is provided in the flow diagram of FIG. 4 and corresponding description, which show and describe the functionality of prefetch device 235 in accordance with some embodiments.

FIG. 3 is a flow diagram illustrating a method for efficiently handling data read requests from a first device on a first bus to a second device on a second bus, in accordance with some embodiments. Processing begins at 300 whereupon, at block 315, a read request is detected from a first device on a first bus for an amount of data to a second device on a second bus. In some embodiments, the first bus may not have the capability to communicate information about the amount of data that is being requested. In some embodiments, the detection may be performed by a device such as prefetch device 135.

At block 320, a request for the read data is received by a bridge, and in response, the bridge requests a first portion of the data from the second device on behalf of the first device. The bridge is configured to couple the first bus to the second bus. In some embodiments, the bridge requests a first portion of the data since the bridge may not have information about the total amount of data being requested by the first device. In some embodiments, the bridge may be a device such as bridge 130 and the second device may be a device such as second device 120.

At block 325, the bridge is triggered to request an additional portion of the data. In some embodiments, a record of the total amount of data to be transferred is stored and that amount is compared to the total amount of the data that has been requested. An additional amount of data is requested in response to determining that additional data is required to complete the original read request. In some embodiments, the triggering may be performed by a device such as prefetch device 135. Processing ends at 399.

FIG. 4 is a flow diagram illustrating a method for efficiently handling read data requests from a device on a Peripheral Component Interconnect (PCI) bus to a device on a PCI-Express bus, in accordance with some embodiments. Processing begins at 400 whereupon, at block 410, a PCI device issues a read request to a PCI-Express device. In some embodiments, the PCI device may be coupled to a PCI bus and the PCI-Express device may be coupled to a PCI-Express bus. The PCI bus and the PCI-Express bus may be coupled to each other through a PCI-to-PCI Express bridge. In some embodiments, the PCI bus may not have the capability to communicate/transfer information on the amount data requests. That is, the total amount of the data being requested by the PCI device may be unknown, and therefore, the PCI device issues sequential read requests to the PCI-Express device. In some embodiments, the functionality illustrated in this figure may be performed by the devices in FIG. 2.

At block 415, the prefetch device detects and registers the request for data from the PCI device to the PCI-Express device, including the amount of data being requested. At block 420, the bridge receives the request for the data and, at decision 425, a determination is made as to whether read buffer is available at the bridge. If buffer space is not available, decision 425 branches to the "no" branch where the bridge waits until buffer space becomes available.

If space is available, decision 425 branches to the "yes" branch where, at block 430, the bridge allocates buffer space and issues a read request for a portion of the data to the PCI-Express device. In some embodiments, the bridge requests only a portion of the data since information on the total amount of data does not reach the bridge through the PCI bus.

At block 435, the prefetch device detects and registers the request by the bridge, including the amount of the portion of the data that was requested by the bridge. In some embodiments, the prefetch device is configured to store the cumulative amount of data that has been requested by the bridge on behalf of the PCI device.

A determination is then made as to whether the prefetch device should trigger the bridge to request additional data on behalf of the PCI device. In some embodiments, the prefetch device compares the total amount of data requested by the PCI device to the cumulative amount of data that has been requested by the bridge on behalf of the PCI device. If no additional data is required, decision 440 branches to the "no" branch whereupon processing ends at 499.

On the other hand, if there is additional data to be transferred, at block 445, the prefetch device sends to the bridge an additional request for an additional portion of the data. Processing then continues at block 420, where the bridge adds the request to the read buffer assuming space is available.

Figure 5:
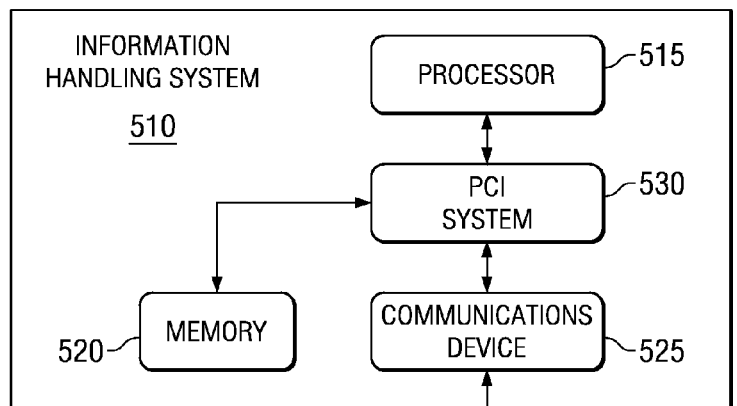
FIG. 5 is a block diagram illustrating an information handling system including a Peripheral Component Interconnect (PCI) system having a prefetch device, in accordance with one embodiment.

FIG. 5 is a block diagram illustrating an information handling system including a Peripheral Component Interconnect (PCI) system having a prefetch device, in accordance with one embodiment. Information handling system 510 may include memory 520, processor 515, and communications device 525. Other configurations of the information handling system are possible. In some embodiments, one or more of the components of information handling system 510 may be coupled using PCI system 530, which may include one or more types of PCI busses coupled by appropriate bridges. PCI system 530 may also include a prefetch device that may be similar to prefetch device 135 for optimizing data transfers through PCI system 530.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for improving data transfers between devices, the method comprising:
    detecting a first device on a first bus issuing a read request for an amount of data to a second device on a second bus;
    detecting a bridge requesting a first portion of the data from the second device on behalf of the first device in response to the bridge receiving the read request, the bridge coupling the first bus to the second bus;
    determining a total amount of the data requested by the bridge; and
    triggering the bridge in response to determining that the total amount of data requested by the bridge is less than the amount of data to request an additional portion of the data on behalf of the first device.

2. The method of claim 1, where the bridge receiving the read request comprises the bridge receiving the read request for an unknown amount of data.

3. The method of claim 1, where the first bus is a parallel bus and where the second bus is a serial bus.

4. The method of claim 3, where the first bus is a Peripheral Component Interconnect (PCI) bus and where the second bus is a PCI Express bus.

5. A prefetch device, where the prefetch device is configured to couple to a first device on a first bus and where the prefetch device is configured to couple to a bridge coupling the first bus to a second bus, the second bus being coupled to a second device, the prefetch device being further configured to:
    detect the first device on the first bus issuing a read request for an amount of data to the second device on the second bus;
    detect the bridge requesting a first portion of the data from the second device on behalf of the first device in response to the bridge receiving the read request;
    determine a total amount of the data requested by the bridge; and
    trigger the bridge in response to determining that the total amount of data requested by the bridge is less than the amount of data to request an additional portion of the data on behalf of the first device.

6. The prefetch device of claim 5, where the first bus is a parallel bus and where the second bus is a serial bus.

7. The prefetch device of claim 6, where the first bus is a PCI bus and where the second bus is a PCI Express bus.

8. A computer program product stored on a computer operable medium, comprising software code which, when executed on an electronic device, causes the electronic device to:
    detect a first device on a first bus issuing a read request for an amount of data to a second device on a second bus;
    detect a bridge requesting a first portion of the data from the second device on behalf of the first device in response to the bridge receiving the read request, the bridge coupling the first bus to the second bus;
    determine a total amount of the data requested by the bridge; and
    trigger the bridge in response to determining that the total amount of data requested by the bridge is less than the amount of data to request an additional portion of the data on behalf of the first device.

9. The product of claim 8, where the first bus is a parallel bus and where the second bus is a serial bus.

10. The product of claim 9, where the first bus is a PCI bus and where the second bus is a PCI Express bus.

11. An information handling system comprising:
    one or more processors;
    one or more memory units coupled to the processor;
    one or more communications devices coupled to the processor; and
    a prefetch device, where the prefetch device is configured to couple to a first device on a first bus and where the prefetch device is configured to couple to a bridge coupling the first bus to a second bus, the second bus being coupled to a second device, the prefetch device being configured to:
    detect the first device on the first bus issuing a read request for an amount of data to the second device on the second bus;
    detect the bridge requesting a first portion of the data from the second device on behalf of the first device in response to the bridge receiving the read request;
    determine a total amount of the data requested by the bridge; and
    trigger the bridge in response to determining that the total amount of data requested by the bridge is less than the amount of data to request an additional portion of the data on behalf of the first device.

12. The system of claim 11, where the first bus is a parallel bus and where the second bus is a serial bus.

13. The system of claim 12, where the first bus is a PCI bus and where the second bus is a PCI Express bus.

* * * * *